United States Patent Office 3,212,922
Patented Oct. 19, 1965

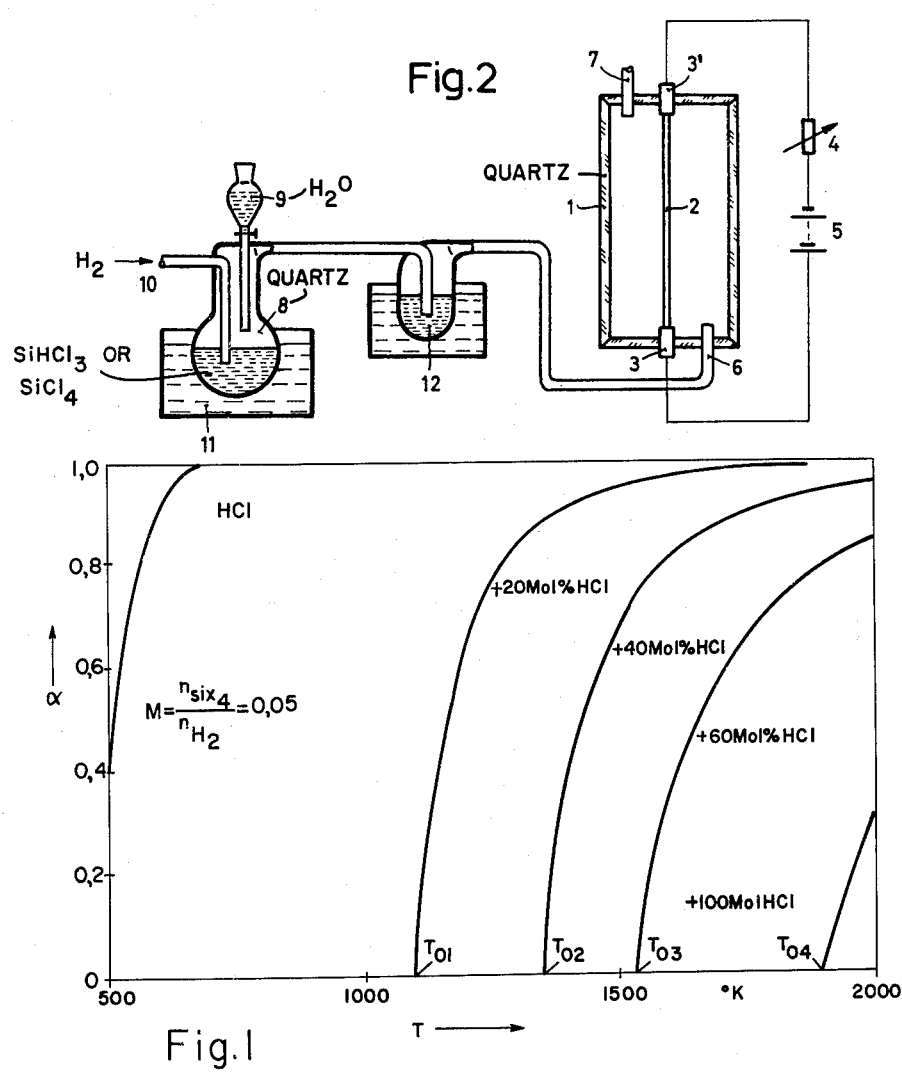

3,212,922
PRODUCING SINGLE CRYSTAL SEMI-
CONDUCTING SILICON
Erhard Sirtl, Munich, Germany, assignor to Siemens & Halske Aktiengesellschaft, Berlin and Munich, Germany, a corporation of Germany
Filed Oct. 23, 1961, Ser. No. 146,783
Claims priority, application Germany, Nov. 14, 1960, S 71,249
6 Claims. (Cl. 117—106)

This invention is concerned with a method of producing single crystal semiconducting silicon and may be considered an improvement on the method described in copending application Serial No. 81,607, filed January 9, 1961.

In the prior method, a flowing reaction gas mixture, preferably a purified halogen-containing silicon compound, especially a halogen silane and hydrogen, is conducted over a heated silicon carrier body disposed in a reaction vessel, whereby the silicon which is respectively due to thermal or electrothermal decomposition separated from the reaction gas mixture, is precipitated upon the carrier to effect single crystal growth thereon.

It is in practicing such method advisable to add to the reaction gas mixture, before it enters into reaction with the hot surface of the silicon carrier body, a halogen compound acting to shift the reaction equilibrium in disfavor of the silicon which is being liberated and separated, in such an amount, that the temperature below which the silicon separation is, owing to the addition of the halogen compound, completely inhibited, remains below the separation temperature of the surface of the carrier upon which the silicon is separated or precipitated. This is being done because the addition of the halogen compound makes it possible to dose advantageously and in simple and easily adjustable manner the amount of the silicon to be separated for the single crystal growth, so that the silicon obtained orients itself with respect to the grid of the single crystal carrier, thus effecting single crystal growth of the latter.

However, the purity of the silicon is not satisfactorily and sufficiently secured by this measure if the halogen-containing silicon compound, which is contained in the reaction gas, for example, in vapor form, is not sufficiently purified as to boron compounds, since boron can then be separated in the process.

Such boron contamination in silicon is particularly disturbing, since it is very difficult to remove boron from the silicon in the course of a subsequent zone melting operation. It must also be considered that great difficulties are experienced in attempting to purify the silicon compound, for the formation of the reaction gas, especially silicochloroform which is particularly well adapted, of boron which is usually contained in such compound in the form of boron halides or halogen borites, so that the silicon compounds which are customarily available for the purpose in view, especially silicochloroform, often exhibit a boron content amounting to $10^{-2}$ to $10^{-3}$ atom percent boron/silicon.

It is in view of the above explained situation of great interest to simplify the required purification of the silicon compound from which the silicon is thermally separated upon the carrier body, by creating conditions according to which silicon compounds with relatively high boron content can be used, and yet holding the boron content in the separated silicon very low and especially considerably lower than the amount of boron contained in the silicon compound of the reaction gas.

Very extensive experimental and theoretical investigations have revealed that it is possible in the case of boron, as it is in the case of silicon, to shift the equilibrium of decomposition of the disturbing boron compounds in the reaction gas, in the presence of properly apportioned amounts of the other partners of the reaction process, by the addition of halogen compounds, especially, for example, halogen hydrogen, such that boron is not anymore separated below even minimum temperatures even if it is contained in relatively large amounts in the reaction gas. It has also been ascertained that, in the presence of mol proportions of silicon, boron and hydrogen in the reaction gas, which are suitable for the production of silicon semiconductors, and with the addition of considerable amounts of halogen compounds such, for example, as HCl, these minimum temperatures for the boron separation can be placed sufficiently high above the minimum temperatures for the separation of the silicon, when the mol proportions in the reaction gas, are, in accordance with the invention, held within given limits and when the temperature of the surface of the silicon carrier upon which only the silicon precipitates from the reaction gas in as large amount as possible, while practically no boron is precipitated, is selected so that it lies below the minimum separation temperature of boron but above the minimum separation temperature of silicon. It is particularly advisable to make the amount of halogen compound added to the reaction gas mixture so great that this minimum temperature at which the boron can separate from the boron-containing mixture, is higher than the melting temperature of the silicon.

The cause for the appearance of the minimum separation temperature of the boron, in the decomposition of the boron which is contained in the reaction gas, for example, in the form of boron chloride ($BCl_3$), resides, according to investigations so far conducted, in that according to the mass action law, a definite $BCl_3$ equilibrium pressure corresponds at a given hydrogen concentration to a definite HCl content. Upon calculating the $BCl_3$-equilibrium pressures at different HCl content for a defined separation temperature according to the equation $$BCl_3 + 3/2 H_2 \rightleftharpoons B + 3HCl$$

it will be seen from the following series example for a reaction temperature of, for example, 1400° K. and a mol ratio $SiHCl_3/H_2 = 1:20$, wherein the $pH_2$-value≅1 can be assumed, that there exists a strong dependence of these values on the HCl content:

Building-in of boron in silicon according to the equation
$BCl_3$ (gaseous) $+3/2 H_2 \rightleftharpoons B$ (solid) $+3HCl$ Equilibrium constant:

$pH_2 \cong 1$ may be entered for the mol ratio $SiHCl_3/H_2=1:20$

For $pHCl = 10^{-2}$ (at.) (about the experimentally ascertained equilibrium concentration in the C-method) there is obtained:

$pBCl_3$ to $4.0 \cdot 10^{-6}$ (at.), i.e. $4.0 \cdot 10^{-4}$ mol percent $BCl_3$ For $pHCl = 3 \cdot 10^{-2}$ (at.) there is obtained:

$pBCl_3 = 1.1 \cdot 10^{-4}$ (at.), i.e. $1.1 \cdot 10^{-2}$ mol percent $BCl_3$ which means, that the limit concentration of the boron trichloride that can be present without boron separation in the gas equilibrium, is upon increase of the HCl-content changed threefold by more than one tens power. Accordingly, boron is in the last noted case only separated when the amount of $BCl_3$ in the chloride silane exceeds $10^{-2}$ mol percent; normal boron concentration in commercially available $SiHCl_3$ amounting to about $10^{-3}$–$10^{-4}$ mol percent.

It is accordingly possible to specify for any boron content in the reaction gas mixture or chloride silane, respectively, an HCl concentration which prevents boron separation in the silicon, since the equilibrium concentration of the boron trichloride is for this case greater than the amount of $BCl_3$ introduced into the reaction chamber with the chloride silane. It is of course understood that the boron separation can also be inhibited, assuming a given HCl- and $H_2$-concentration, by alteration of the separation temperature.

The invention will now be described with reference to the accompanying drawing wherein:

FIG. 1 is a chart illustrating the relationship existing between boron separation, HCl content and temperature of the Si-separation for a mol ratio (MR)
$$SiHal_4/H_2 = 0.05$$
and FIG. 2 illustrates an arrangement for carrying out the method of the invention.

The investigations underlying the invention have also revealed that the subchloride formation plays an important part as an intermediate stage if the hydrogen excess in the reaction gas is not too high or the boron halide concentrations in the halogen silane greater than, for example, >1 percent. Thus, for example, the decomposition of the boron chloride is effected in accordance with the following two steps:

(1) $BCl_3 + H_2 = BCl + 2HCl$
(2) $BCl + 1/2 H_2 = B + HCl$

The theoretical and practical investigations have shown that in the first noted reaction (formation of the subchloride BCl according to Formula 1), the subchloride formation increases with increasing temperature, while the formation of the boron from the subchloride decreases in the second reaction (Formula 2) with increasing temperature. The reaction equilibrium, as revealed by the investigations, is thus at sufficiently high temperatures T strongly shifted to the boron subchloride, that the boron which had been formed in the thermal decomposition upon the surface of the carrier is with the chloride of the added HCl separated from the carrier surface with liberation of hydrogen as subchloride; however, to achieve this, the amount of the halogen compound, for example the HCl, in the reaction gas, must be sufficiently great and the hydrogen amount in the reaction gas must not be too great.

It will be seen from these two partial reactions, which change with increasing temperature in opposite directions, that it is possible with proper selection of the temperature of the surface at which the silicon is separated or precipitated, to prevent separation of the boron by providing in the reaction gas mixture a sufficiently great amount of a halogen compound, especially HCl.

These theoretical investigations have been confirmed in practice. Thus, with an amount of about 0.1 mol percent boron chloride ($BCl_3$) in silicochloroform ($SiHCl_3$), the amount of the separated boron in the separated silicon could be altered by alteration respectively of the halogen content or chloride hydrogen content in the reaction gas mixture.

The drawing shows the results of these investigations. The absolute temperature (T) of the carrier surface upon which the silicon together with the boron is precipitated or separated from the flowing reaction gas mixture, is plotted upon the horizontal axis. Along the ordinate is plotted the coefficient $\alpha$ which indicates the ratio of the boron amount contained in the solid precipitated silicon body with respect to the boron content in the reaction gas mixture referred to the silicon. Accordingly, in the case of a coefficient equal to 0.6, the proportion of boron in the precipitated silicon amounts to only 60 percent of the amount of boron referred to the silicon in the reaction gas mixture. The drawing also shows the mol ratio

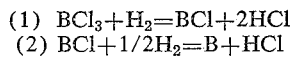
$$MR = \frac{^nSiX_4}{^nH_2} = 0.05$$

of the silicon compound $SiX_4$ to the hydrogen gas amount in the reaction gas mixture, for which the indicated curves were calculated wherein $n$ represents the number of moles. Moreover, there is indicated at the curves as a parameter, the mol percent amount of the HCl referred to the silicon compound in the reaction gas mixture. Accordingly, in the total equation for the reaction and separation process of the boron upon the carrier

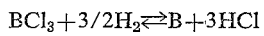
$$BCl_3 + 3/2 H_2 \rightleftarrows B + 3HCl$$

the reaction equilibrium is, as the curves show, shifted the more in disfavor of boron separation, the more HCl is added to the reaction gas mixture.

For example, if the mixture does not contain any HCl, the coefficient $\alpha$ will become equal to 1 already at a temperature $T_1$=about 650° K., that is, the atom percent amount of the boron is in the separated silicon as great as the atom percent amount of the boron referred to the silicon in the reaction gas mixture. However, if the reaction gas mixture contains 20 mol percent HCl (referred to the silicon compound in the gas), practically no boron is separated or precipitated up to a temperature $T_{01}$=about 1100° K.; only at higher temperatures will the coefficient $\alpha$ of the precipitated boron strongly increase. In the case of greater mol percent amounts of the HCl (40 mol percent, 60 mol percent and 100 mol percent), the temperature at which the separation of the boron starts, increases to correspondingly higher minimum temperatures ($T_{02}$, $T_{03}$, $T_{04}$). Accordingly, the separation of boron begins only after exceeding the respective minimum temperatures, whereby these temperatures (see, for example, $T_{04}$) can be increased far beyond the melting temperature of the silicon.

The separation upon the carrier, of the boron together with the silicon, is moreover co-determined by the amount of the hydrogen in the reaction gas mixture from which the separation is effected. As will be seen from the consideration of the total reaction equation for the separation process of the boron upon the carrier, the equilibrium of the reaction is with increasing hydrogen content shifted in favor of the separation of boron and the minimum temperature $T_0$ required for the boron separation is thereby reduced. If follows, therefore, that the above noted mol ratio MR between the silicon compound $SiX_4$ and the hydrogen ($H_2$) shall if possible not drop below a value of approximately 0.02 (2 percent). This is to be observed especially at the start of the operation, when the reaction vessel is, just ahead of the first inflow of the reaction gas mixture, filled with hydrogen, as is the case, for example, when the single crystal silicon carrier had been annealed in a hydrogen stream shortly before the start of the separation so as to secure proper single crystal growth of silicon thereon. The fact that the hydrogen halide according to the reaction equation

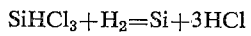
$$SiHCl_3 + H_2 = Si + 3HCl$$

forms in the gas mixture in the decomposition of the silicon-halogen-compound, leading to the separation of silicon upon the carrier, operates favorably, that is, toward a reduction of the boron content in the separated silicon, because the HCl formed in this manner opposes for the above explained reasons the separation of the boron.

However, it is to be observed in this connection that this effect can become operative only after the reaction has started. Prior thereto, that is, directly before starting of the process, upon first entry of the gas mixture into the reaction chamber containing the highly heated carrier, no HCl or insufficient HCl has formed in the gas mixture by decomposition of the silicon compound, and the amount of boron separating upon the carrier is as yet great. This may go so far that the boron amount in the ultimate silicon body becomes unduly high solely owing to the fact that the full proportion of the boron contained in the halogen silane had been separated at the start of the process, so that the boron content is too high even with uniform distribution over the entire cross-sectional area of the silicon carrier. Accordingly, even if care is taken to carry out the operation after the start thereof, at a given HX-equilibrium concentration required for the decomposition, by the proper selection of the gas mixture, so that practically no boron is separated, the ultimate silicon body can still contain too much boron, simply because too much boron had been separated at the start of the operation. The initial phase or start of the operation therefore requires particular attention.

The invention accordingly proposes, in connection with a method for separating upon a highly heated carrier body silicon or the like, from a gas mixture containing hydrogen in addition to the silicon compound from which silicon is by thermal decomposition separated upon the carrier body, to add to the gas mixture, in carrying out the separation operation, a hydrogen halide compound, especially HCl. This can be effected at the start of the operation and as desired also thereafter during the separation operation. The amount of the added hydrogen halide compound shall be so great that practically no boron is precipitated with the silicon. As shown in the drawing, the amount required therefor depends upon the temperature ($T$) of the surface of the carrier upon which the separation is effected. For example, when operating with a surface temperature ($T$)=about 1400 K., it is advisable to add at the start of the operation a high mol percentage HCl, amounting at least to the amount thereof which is present in the course of the further reaction. The amount of the halogen-hydrogen to be added to the gas mixture can be reduced once the decomposition of the silicon compound and the formation of the halogen-hydrogen compound have started, since further halogen-hydrogen compound is formed incident to the decomposition of the silicon, acting against the boron separation. It is, however, advisable to add even in continuous operation a halogen-hydrogen compound to the gas mixture in the case of high boron content in the chloride silane.

FIG. 2 illustrates an arrangement for carrying out the method of the invention, in which numeral 1 indicates a quartz vessel in which is disposed a thin rod 2 consisting of hyperpure or doped silicon upon which is to be precipitated respectively hyperpure or doped silicon obtained from a gaseous phase so as to grow thereon in monocrystalline manner. Electrodes 3 and 3' made of heat resistant material such as graphite, molybdenum and the like, which shall be as pure as possible, serve for holding the rod 2 in place. The rod 2 is held at the separation temperature T, for example, 1150° C., by electric current passing therethrough, which is supplied from a current source 5 over an adjustable stabilizing resistor 4. The reaction gas enters into the vessel 1 at 6 and the waste gases are discharged at 7.

A vaporizing vessel 8, made of quartz, is provided for producing the reaction gas, such vessel containing $SiCl_4$ or $SiHCl_3$ in liquid condition. Into this vaporization vessel extends the extension of a receptacle 9 which contains highly pure distilled water which drops in regulatable manner into the $SiCl_4$ or $SiHCl_3$ contained in the vessel 8. Some of the silicon halide compound contained in the vaporization vessel is thereby hydrolized, thereby producing HCl and silicic acid. Highly purified hydrogen is supplied to the vaporizer 8 at 10 in a regulatable stream and is loaded with the abundantly present vapor of the silicon compound and with the developed HCl, whereupon it is conducted, if desired with further addition of hydrogen, over a cooling trap 12 (for freezing out the water vapors) into the separation vessel 1. If desired, a further vaporization vessel supplied with $SiCl_4$ or $SiHCl_3$ can be connected serially with or in parallel with the vaporizer 8, which distinguishes from 8 in that no HCl is developed therein.

The vaporizer or vaporizers are respectively arranged in a temperature bath 11 which is utilized for regulating the rate of vaporization of the silicon compound. The adjustment of the temperature in the vaporizer as well as of the velocity of the hydrogen stream and the amount of distilled water supplied in drops from the receptacle 9, give the possibility of regulating the composition of the reaction gas in desired and definite manner. The separation curve is by the content of HCl shifted in the described manner so as to fulfill, in cooperation with the surface temperature T of the carrier, the teachings of the invention.

As already explained in the copending application, the addition of a halogen-hydrogen compound to the reaction gas mixture has an unfavorable effect on the separation of silicon from such gas mixture, since the amount of silicon separated from the mixture decreases with the increasing proportion of the halogen-hydrogen compound. In accordance with the invention, the amount of the continuously added halogen-hydrogen is limited since the selected separation temperature upon the surface of the carrier, on which the silicon is to be precipitated, is to be sufficiently high above the minimum separation temperature of the silicon. The level of this minimum separation temperature with respect to the surface temperature of the carrier shall be particularly so selected that at least about 50 percent of the theoretically possible yield curve of the decomposable silicon conducted into the reaction vessel shall be separated upon the carrier ($\alpha Si$=at least 0.5).

As already mentioned before, the hydrogen in the gas mixture also plays an important part in that it favors with increasing proportion in the gas mixture the separation of the boron and the silicon. This is of particular importance in the case of a separation process with the object of obtaining single crystal growth. It must be considered in this connection that if the silicon is to grow upon a single crystal silicon carrier, it is desirable to liberate the surface of the single crystal carrier, prior to the separation operation, by annealing in a hydrogen gas stream, even of traces of adhering oxygen. The single crystal silicon carrier which is disposed in the reaction vessel is for this purpose highly heated by current flowing therethrough, before the reaction gas mixture is introduced into the reaction vessel and a hydrogen gas stream is at the same time caused to flow through the reaction vessel. If the reaction gas mixture would be without particular precaution introduced into the reaction vessel directly upon conclusion of the hydrogen annealing operation applied to the single crystal silicon carrier, the hydrogen concentration would be at the start of the separation process particularly high as compared with the chloride silane concentration, with the result that the boron separation would be particularly favored.

Such a favoring of the boron separation is also effected when the annealing of the silicon carrier in a hydrogen stream prior to the silicon separation is omitted and the reaction gas is introduced into the reaction vessel at the start of the process in a constant composition, that is, in a composition which remains constant throughout the separation operation. In such case, the proportion of the halogen hydrogen in the reaction gas is at the start of the inflow smaller than after the equilibrium condition of the gas composition in the reaction vessel is reached, since no halogen hydrogen, formed incident to the separation, is at yet present in the reaction vessel. Only after a given time interval during which the amount of halogen hydrogen in the reaction vessel will increase, owing to the start of silicon separation, will this component assume its full value, which it retains during the further course of the process, so long as the measures for the method are not changed. It is for these reasons advisable to apply measures at the start of the operation which operate to keep the boron amount small during the respective time interval. It is particularly advisable to apply these measures so that the temperature of the surface of the carrier, the hydrogen concentration and the halogen hydrogen concentration, respectively, in the reaction vessel are, at the start of the process, during the noted time interval, mutually matched so that substantially no boron is separated during this time interval.

The mol ratio, in the reaction vessel, of the halogen silane to the hydrogen is preferably quickly brought to the value desired for the constant condition of the process. In case a high reaction action is until then exerted on the boron halide, owing to a high hydrogen content in the reaction vessel, such action which leads to the separation of boron is according to the invention stopped by a particularly great amount of the halogen hydrogen in the initially inflowing reaction gas. This great amount of halogen hydrogen in the inflowing gas can be reduced when the high hydrogen proportion drops correspondingly. It is however in many situations advisable, for example, after the annealing of the carrier in a hydrogen stream, to rinse the reaction vessel prior to the introduction thereinto of the halogen silane, with a hydrogen stream to which are added halogen hydrogen substances preferably of at least 1 to about 10 mol percent. The reaction gas mixture is introduced into the reaction vessel only after the rinsing of the apparatus with this mixture, whereby the reaction gas mixture may likewise have a halogen hydrogen content of the same value, which can be further reduced in the course of the process.

A particular advantage of the method according to the invention resides in that the separation of other substances effecting impurity center conductivity is prevented coincident with the practically effective prevention of the boron separation during the separation of the silicon. In particular, the minimum separation temperatures of the substances which are active in the silicon as acceptors, for example, aluminum, lie appreciably above the minimum separation temperatures of boron, so that even these contaminations, which are effective as acceptors, are not separated with the silicon when the boron separation is in accordance with the invention inhibited. The substance acting as acceptor can be present in the reaction gas, in the form of vapor or gaseous compound up to an atomic ratio of about 0.2 and particularly about 0.1 atom percent or less. Accordingly, the silicon compounds of the reaction gas mixture need not be practically completely liberated of these impurity substances by any particular costly purification operation; such substances nevertheless will practically not be separated with the silicon in the method according to the invention.

Changes may be made within the scope and spirit of the appended claims which define what is believed to be new and desired to have protected by Letters Patent.

I claim:

1. A method of producing compact silicon, wherein a reaction gas containing a halogen silane intermixed with purified hydrogen is conducted over a heated carrier body made of silicon, to liberate the silicon from the reaction gas due to thermal decomposition, whereby such silicon is precipitated upon the carrier and thus grows thereon, comprising the steps of maintaining the silicon and hydrogen in the reaction gas in a molecular ratio of Si to H of at least about 2 percent and boron in a maximum molecular ratio of B to Si of about 0.1 percent, adding hydrogen chloride to the reaction gas, operative to shift the reaction equilibrium of the boron to increase the separation temperature thereof, and maintaining the surface of said carrier body at a temperature, at which the silicon is separated and deposited thereon, and which is below the minimum separation temperature of the boron under the existing equilibrium conditions.

2. A method according to claim 1, wherein said hydrogen chloride compound is added to said reaction gas mixture before effecting the reaction thereof on the heated surface of said carrier body.

3. A method according to claim 1, wherein hydrogen chloride equilibrium concentration effected is by the conversion.

4. A method according to claim 1, wherein the reactions take place in a reaction vessel, comprising rinsing the reaction vessel by a gas consisting of hydrogen chloride and hydrogen, prior to conducting into said vessel reaction gas containing the silicon compound.

5. A method according to claim 1, wherein the reactions take place in a reaction vessel, comprising regulating the mixing ratios of the hydrogen and hydrogen chloride and the silicon compound, in the reaction vessel, and the temperature of the carrier body as well as the composition of the reaction gas flowing into the reaction vessel, at the start of the inflow of said gas, so as to substantially inhibit the separation of boron.

6. A method according to claim 1, wherein the reactions take place in a reaction vessel, comprising initially conducting through said reaction vessel a stream of pure hydrogen while highly heating the silicon carrier body upon which the silicon is to be separated in single crystal form, thereupon initially conducting into said reaction vessel a gas which is free of a silicon compound but containing hydrogen chloride, and thereafter conducting into said reaction vessel the reaction gas mixture which contains the silicon compound.

References Cited by the Examiner

UNITED STATES PATENTS

| 2,904,404 | 5/59 | Ellis | 23—223.5 |
| 2,943,918 | 7/60 | Pauls | 23—223.5 |
| 2,981,605 | 4/61 | Rummel | 23—223.5 |
| 3,011,877 | 12/61 | Schweikert et al. | 23—223.5 |
| 3,021,198 | 2/62 | Rummel | 23—223.5 |

RICHARD D. NEVIUS, *Primary Examiner.*

M. A. BRINDISI, *Examiner.*